3,572,149
Patented Mar. 23, 1971

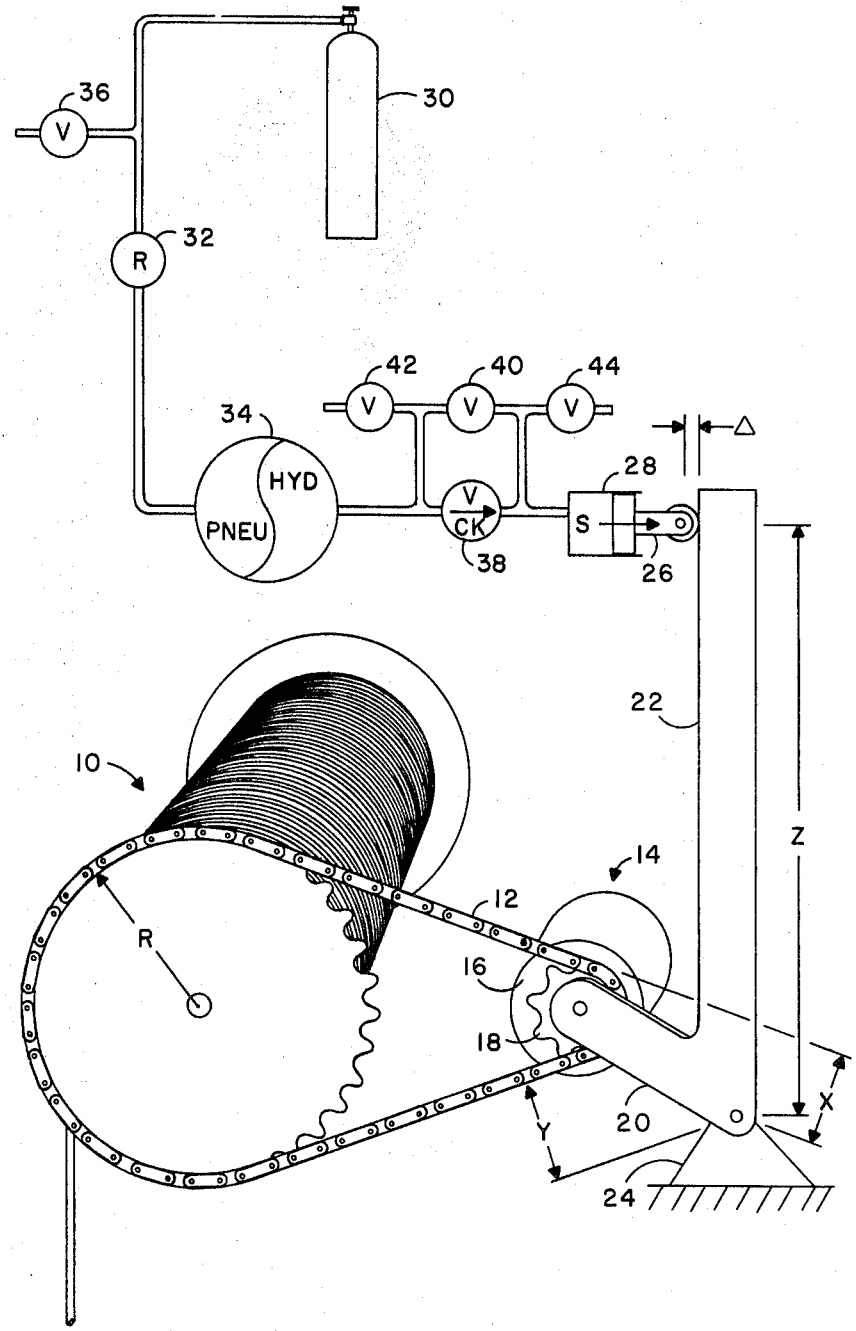

3,572,149
DRIVE MECHANISM
Robert W. Cain, Dallas, and Richard H. Sliger, Richardson, Tex., assignors to Collins Radio Company, Dallas, Tex.
Filed May 19, 1969, Ser. No. 825,881
Int. Cl. F16h 7/14
U.S. Cl. 74—242.15                                                  1 Claim

ABSTRACT OF THE DISCLOSURE

A motor means is mounted on the short arm of a two armed lever. The motor means is connected to a driven means by an endless chain. The long arm of the lever is loaded by a hydraulic cylinder means whereby tension in the chain is maintained, and backlash is kept at a minimum.

BACKGROUND OF THE INVENTION

This invention relates to power transmissions generally, and more particularly to a transmission of the chain drive type having a minimum of backlash.

Numerous arrangements have been devised for maintaining tension in belts of belt driven machines to thereby improve power transmission with a minimum of wear of the belt. Typically, such machines are constant operating, unidirectional system with no backlash considerations.

For example, Hammelmann 3,187,674 discloses such a system which utilizes a hydraulic regulating device in a transmission for driving a hydrodynamic machine having resistance which increases proportionally with fluid pressure being built up in the machine. Leifer 2,736,207 discloses a belt driven machine which includes hydraulic tensioning means to maintain a desired tension in the belt during machine operation, but which relieves the belt of all tension when the machine is not in operation.

These above referenced systems are not concerned with backlash considerations and are not designed to alleviate backlash problems. A conventional approach in designing transmissions having minimum backlash includes the use of a dual drive means wherein one drive motor is driven against another drive motor through a conventional gear mechanism. Typically, this arrangement involves three or more gears of relatively high precision, considerable space to accommodate the entire system, and considerable cost in the duplication of drive motor and gear transmission.

SUMMARY OF THE INVENTION

An object of this invention is an improved mechanical system including a transmission with minimum backlash.

Another object of the invention is a transmission with minimum backlash which is relatively economical.

Still another object of the invention is a mechanical system including driving and driven elements and transmission which occupies a minimum of space.

A feature of the invention is a hydraulic system which maintains continuous tension on a chain element or like endless belt means to eliminate slack and which provides increased tension to prevent backlash due to fluctuating loads such as encountered when accelerating or changing directions.

Other objects and features of the invention will be apparent from the following description and appended claims.

In summary, the system of the present invention includes a driving element, a driven element, an endless belt means such as a chain for driving the driven element. The driving element is mounted on pivoted mount means and pressure is exerted by hydraulic means against the pivoted mount means to maintain tension in the endless belt means. Means including a check valve connects said hydraulic means to a pressure source. Increasing load of the driven means, such as by change of rotation or acceleration of rotation, is transmitted by said pivoted mount means to said hydraulic means whereby said check valve is closed thereby increasing pressure of said hydraulic means against said pivoted mount means and minimizing backlash.

The invention will be more fully understood from the following detailed description and appended claim.

DESCRIPTION OF THE DRAWING

The figure is a schematic of a preferred embodiment of the invention.

DESCRIPTION OF AN ILLUSTRATIVE EMBODIMENT

Referring now to the drawing, driven element 10, which may be a cable spool, tumbler or the like, the rotation of which must be accurately controlled, is mechanically linked by a chain or similar endless belt means to a driving element 14 including motor 16 and sprocket 18. Driving means 14 is rigidly supported on arm 20 of mount element 22 which is pivotally supported by support means 24. The upper end of support element 22 is in pressure engagement with piston 26 of hydraulic cylinder 28.

Pneumatic pressure source 30 is connected through pressure regulator 32 to an accumulator 34 which transfers the pneumatic gas pressure to hydraulic means. A high pressure bleed valve 36 is provided in the line between the pneumatic pressure source 30 and pressure regulator 32.

The hydraulic side of accumulator 34 is connected through check valve 38 to hydraulic cylinder 28. Bypass valve 40 is provided to bypass check valve 38, and a regulated pressure bleed valve 42 and a cylinder release valve 44 are provided at either side of bypass valve 40. These valves are primarily for maintenance purposes.

The gas supplied by pressure source 30 is regulated by pressure regulator 32 to obtain a usable gas pressure which is then introduced to accumulator 34. The pneumatic pressure is transmitted to a hydraulic fluid by accumulator 34, and the hydraulic fluid is then fed to hydraulic cylinder 28. Thus, the force S, exerted by hydraulic cylinder 28 on element 22 is directly proportional to the regulated pressure in the hydraulic cylinder.

When the system is in a static state, such as exists when there is either no load or a constant load being driven, the force, S, exerted on element 22 by hydraulic cylinder 28 maintains tension in both legs of the chain 12. Thus, for example, when the system is at rest, no slack is allowed to accumulate in either leg of chain 12. When the load on the driving element 14 increases either through acceleration of the load or a change of direction of rotation of the load, the increased tension in chain 12 is transmitted through the pivoted mount element 22 to the piston 26 of hydraulic cylinder 28, whereupon check valve 38 is closed thus increasing the pressure in hydraulic cylinder 28. Consequently, the force exerted through piston 26 caused by the displacement, Δ, of the piston counters the increase in force exerted by the mount element 22. The displacement, Δ, is relatively small due to the bulk modulus of the hydraulic fluid. When the increase in force exerted by mount element 22 is removed through the system again achieving a static condition, the hydraulic cylinder 28 again maintains the force, S, on mount element 22 through the opening of check valve 38.

Consider now the static forces in the system. The drive means 14 is positioned on the pivoted mount element 22 in such a manner that the moment arms of the chain portions on either side of sprocket 18, designated X and Y, are equal. Accordingly, the system has the same response in either driven direction. Also, the servo system design is facilitated. Thus, the force, S, at a moment arm Z loads the chain in tension T whether the motor is rotating clockwise or counter-clockwise. For static conditions $$SZ = YT + XT$$

For dynamic conditions and assuming clockwise rotation, the tension on the slack side of the chain remains at YT while the tension on the taut side of the chain increases from XT to the sum of XT and the tension delivered by the driving means. By maintaining a tension in both sides of the chain in both clockwise and counter-clockwise periods, the backlash of the system is limited to a fraction of the deflection, $\Delta$, of the piston 26. For the described system, backlash may be expressed as follows:

Backlash (inches) = $X\Delta/Z$

Backlash (radians) = $X\Delta/ZR$ where R equals the radius of the driven element.

In systems built and tested, it has been found that deflection, $\Delta$, is relatively small (0.005 inch) and backlash expressed in radians is only 0.00015 radian or 0.0086 degree. Thus, for most applications, the backlash can be considered negligible.

The drive mechanism in accordance with the present invention not only minimizes backlash but also occupies less space and costs considerably less than does the conventional dual drive motor system. As illustrated in the preferred embodiment, the system allows a wider selection of drive ratios, and placement of sprockets is not critical.

While the invention has been described with reference to a specific embodiment, the description is illustrative and not to be construed as limiting the scope of the invention. Various modifications and changes may occur to those skilled in the art without departing from the spirit and scope of the invention.

We claim:

1. In a mechanical system including bidirectional driving means and driven means, a power transmission means having minimal backlash comprising endless chain drive means mechanically connecting said driving means to said driven means, mounting means for supporting said driving means, said mounting means being pivotally supported and including a long portion and a short portion extending away from the pivotal point of said mounting means, said driving means being supportedly mounted on said short portion whereby the moment arms of said endless drive means with respect to said pivotal point are substantially the same in either drive direction of said driving means, hydraulic pressure means including a hydraulic pressure source, a hydraulic cylinder, a pressure line including one-way valve means interconnecting said hydraulic pressure source to said hydraulic cylinder, and piston means in said cylinder in pressure engagement with said long portion of said mounting means in opposition to the force of said endless chain drive means on said short element thereby maintaining tension in said endless chain means.

References Cited

UNITED STATES PATENTS

| | | | |
|---|---|---|---|
| 2,257,758 | 10/1941 | Murch | 74—242.15X |
| 2,479,617 | 8/1949 | Hawley | 74—242.15 |
| 2,736,207 | 2/1956 | Leifer | 74—242.15 |
| 2,927,571 | 3/1960 | Kamlukin | 74—242.15X |
| 3,406,582 | 10/1968 | Frentzel | 74—242.15X |

MILTON KAUFMAN, Primary Examiner